(12) United States Patent
van Lunteren

(10) Patent No.: US 6,611,832 B1
(45) Date of Patent: Aug. 26, 2003

(54) DATA STRUCTURE FOR LONGEST-MATCHING PREFIX SEARCHING AND UPDATING METHOD FOR SEARCH TABLE DATA STRUCTURES

(75) Inventor: Jan van Lunteren, Adliswil (CH)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/973,567

(22) Filed: Oct. 9, 2001

(30) Foreign Application Priority Data

Oct. 30, 2000 (EP) .............................. 00811010

(51) Int. Cl.[7] .............................................. G06F 17/30
(52) U.S. Cl. ................................... 707/3; 707/4
(58) Field of Search ........................... 707/3, 6, 7, 102, 707/8, 9; 370/389, 351, 392, 408, 238

(56) References Cited

U.S. PATENT DOCUMENTS

| | | | | |
|---|---|---|---|---|
| 5,909,440 A | * | 6/1999 | Ferguson et al. | 370/389 |
| 6,052,683 A | * | 4/2000 | Irwin | 707/8 |
| 6,212,184 B1 | * | 4/2001 | Venkatachary et al. | 370/392 |
| 6,341,130 B1 | * | 1/2002 | Lakshman et al. | 370/389 |
| 6,353,873 B1 | * | 3/2002 | Melchior | 711/108 |
| 6,396,842 B1 | * | 5/2002 | Rochberger | 370/408 |
| 6,430,527 B1 | * | 8/2002 | Waters et al. | 703/3 |
| 6,449,256 B1 | * | 9/2002 | Varghese et al. | 370/238 |

* cited by examiner

*Primary Examiner*—Charles Rones
*Assistant Examiner*—Yicun Wu
(74) *Attorney, Agent, or Firm*—Ido Tuchman; Louis P. Herzberg

(57) ABSTRACT

In a system for finding output information such as an output link identification, by a longest-matching prefix search in response to a search key, only a search data structure comprising search tables is provided which is derived from a basic data structure comprising detailed prefix tables. The full basic data structure need not be maintained, but auxiliary information is provided in the search tables of the search data structure to enable reconstruction of relevant portions of the basic data structure when updates have to be made. In an updating procedure, first the relevant search tables are found and then reconverted to the associated prefix tables from which they were derived. Updating is performed on the reconstructed prefix tables which are then reconverted into search tables to be inserted into the search data structure, for replacing or supplementing search tables that required updating.

12 Claims, 10 Drawing Sheets

FIGURE 5 search table:
- FFh: (empty)
- EFh: 8 | W
- EEh: 4 | V
- ⋮
- E0h: 4 | V
- 00h: (empty)

↓ derived prefix table:
| EFh | 8 | W |
| Eh | 4 | V |

↓ updated prefix table:
| Eh | 4 | V |

↓ derived search table:
- FFh: (empty)
- EFh: 4 | V
- EEh: 4 | V
- ⋮
- E0h: 4 | V
- 00h: (empty)

FIGURE 6 search table:
- FFh: (empty)
- EFh: 8 | W
- EEh: 8 | V
- ⋮
- E0h: 8 | V
- 00h: (empty)

↓ derived prefix table:
| EFh | 8 | W |
| EEh | 8 | V |
| ⋮ | | |
| E0h | 8 | V |

↓ updated prefix table:
| EEh | 8 | V |
| ⋮ | | |
| E0h | 8 | V |

↓ derived search table:
- FFh: (empty)
- EFh: (empty)
- EEh: 8 | V
- ⋮
- E0h: 8 | V
- 00h: (empty)

DATA STRUCTURE FOR LONGEST-MATCHING PREFIX SEARCHING AND UPDATING METHOD FOR SEARCH TABLE DATA STRUCTURES

FIELD OF INVENTION

The present invention is related to the field of searching, in response to a given search key such as an IP address, an entry in a data structure comprising stored tables, for determining further handling or forwarding of an item carrying that search key. The searching is based on the principle of finding in the data structure the longest-matching-prefix for a given search key. In particular, the invention is concerned with updating the stored tables in the data structure when the assignment between currently valid prefixes and associated output values or links is changed.

BACKGROUND

Currently, Internet Protocol (IP) forwarding schemes involve typically two data structures. One large central (update) data structure that is managed by software, and a smaller (forwarding) data structure that is managed by hardware.

The fast search operations are performed by hardware on the smaller (forwarding) data structure. This data structure contains only information that is relevant for the search operations and is optimized with respect to currently valid assignments between search keys (prefixes) and output information or forwarding links. Examples of such forwarding data structures were described in a paper by P. Gupta, S. Lin, and N. McKeown: "Routing Lookups in Hardware at Memory Speeds" (IEEE Infocom, San Francisco April 1998, Vol.3, pp. 1240–1247), and also in a paper by V. Srinivasan and G. Varghese: "Fast Address Lookups using Controlled Prefix Expansion" (ACM Trans. Comput. Syst., Vol. 17, No. 1, February 1999, pp. 1–40). In the described systems, a treelike structure of multiple linked tables is provided for looking up prefixes, and the tables are indexed (accessed) by separate segments of the search key.

The central data structure also contains information that is necessary to perform update operations. For example, if a certain routing table entry (i.e., a prefix) is removed, the central data structure will contain information that indicates how packets that were routed according to that routing table entry, will now be routed after that routing table entry has been removed.

In case of an update operation, first the central data structure will be updated, and from the updated information included in the central data structure, the modification of the forwarding data structure will be derived. For this updating operation, no information will be read from the forwarding (smaller) data structure.

In other words: In many present-day systems for longest-matching prefix (LMP) searches in a data structure of stored assignment tables, it is usual to maintain a central data structure from which the relation between all possible prefixes or search keys and respective output values can be determined, and other more efficient data structures which are actually used for LMP searching. These more efficient data structures are optimized with respect to actually valid search keys (prefixes), to save storage space and to achieve shorter search times. When, due to new search key (prefix) assignments, an updating of the search tables is necessary, the central data structure containing all necessary information is updated in a first step. Thereafter, in a second step, the optimized, distributed data structures are updated with information obtained from the updated central data base. An updating in the local, optimized search tables would not be possible because due to the optimization. some information will be missing when updating is required.

The trend for IP routing in the Internet (and for other systems requiring LMP searches) is that the routing tables grow much larger: whereas now they contain less than 100 k entries, systems with more than 500 k entries are soon expected. Also, there will be a need for faster updating: whereas now a few updates per second are sufficient, in the future multiple thousands of updates per second will be necessary.

Due to these trends, the concept of a central data structure for the prefix assignment tables has increasing disadvantages as this will limit the number of updates that can be made, and also will require much more storage as the size of the routing tables grows significantly.

SUMMARY OF THE INVENTION

It is an object of the invention to devise a system with a data structure for finding, in response to a given search key, a matching entry in stored LMP search tables, which requires less storage than presently used search table data structure schemes. It is a further object of the invention to provide a method for updating a search data structure which requires less time for a modification of the search tables than presently used schemes, and which does not require the maintenance of a complete central data structure with all possible routing assignments.

The invented search data structure in a system for finding output information, such as directions for forwarding messages to output links, in response to search keys comprising prefixes used for longest-matching prefix searches, comprises the following features:

a) the search data structure comprising search tables is derived from a basic data structure comprising prefix tables including complete information for prefixes of variable length and respective assigned output information; b) the search data structure is subdivided into subsets of search tables which were separately derived from respective prefix tables in the complete basic data structure; and c) each subset in the search data structure comprises auxiliary information enabling a reconstruction of the respective prefix tables in the basic data structure; which features allow local or partial updating of the search data structure without maintaining the complete basic data structure of prefix tables in the system.

The invented method for updating a search data structure provided for longest-matching prefix searches when the assignment between prefixes and output information is changed by deletion of prefixes or insertion of additional prefixes, said search data structure comprising subsets of search tables separately derived from prefix tables in a basic data structure which is not maintained during normal operation, comprises the following features:

a) determining a relevant subset of search tables including at least one search table to be updated, and reading this from the search data structure; b) reconverting the relevant subset of search tables into an associated subset of prefix tables of the basic data structure, using auxiliary information contained in the relevant subset of search tables, said associated subset including at least one prefix table; c) modifying the prefix tables obtained by reconversion, according to the required changes in the prefix assignments; d) converting the subset of modified prefix tables into a derived subset of new search tables; and e) inserting the derived subset of new search tables into the search data structure, thereby replacing and/or supplementing at least one search table in the relevant subset.

This invention, for overcoming the initially mentioned problems, provides IP forwarding schemes that do not use a central data structure containing full information required for updating, together with one (or plural) smaller data structures adapted for searching and forwarding, but are based on only a single data structure that is used for both, updating as well as forwarding. In order to keep the size of this single data structure small, some form of compression can be applied.

The invention provides, in particular, the use of a single (software-operated) search table data structure for the whole system, which is optimized with respect to currently valid prefix or search key assignments but contains enough additional information to allow updating and optimizing it when the assignments are modified.

The invention has the following advantages over prior art solutions:

1) Fewer memory is needed as the total storage requirements are much smaller. The auxiliary information that is added to the search structure results in much smaller extra storage requirements than the need to maintain two data structures.
2) Update performance can be improved, since due to the smaller storage requirements, it becomes now feasible and cost effective, to implement the entire data structure in fast memory. This in contrast to prior art schemes, that typically store the basic structure in slow (and therefore cheap) memory, and the search structure in fast memory. This allows now to perform much faster update operations, since only fast memory is used too in the update process.
3) A single component, for example a search coprocessor, can now be realized that performs all update and search operations on one data structure. This allows to relieve the control processor for other tasks.

These advantages become more important with the following two trends that can be observed in the current Internet: a) the routing table sizes are growing exponentially, and b) there is a requirement for improving the performance of updating operations.

In the following, embodiments of the invention will be described with reference to the accompanying drawings.

BRIEF DESCRIPTION OF THE DRAWINGS

FIG. 5 and FIG. 6 represent different steps in two similar updating operations for the search tables of FIG. 4, showing the influence of length indications when a fully-covered prefix is present.

FIG. 9 illustrates the steps in an updating operation according to the invention, for the deletion of a prefix and its assigned output value.

FIG. 10 illustrates the steps in an updating operation according to the invention, for the insertion of a prefix and its assigned output value.

DETAILED DESCRIPTION OF A PREFERRED EMBODIMENT OF THE INVENTION

Prior art search algorithms for longest matching prefix searches, involve two data structures, which will be denoted here as basic structure and search structure. The basic structure is used for update operations, and its organization is optimized for performing fast and efficient update operations. The search structure is used for search operations, and its organization is optimized for performing fast and efficient search operations.

The basic structure is typically stored in the memory of a general-purpose control processor that performs the update operations and, based on the update results, determines the modifications that need to be made to the search structure. These modifications are then downloaded to the search engine that stores the search structure. See, for example, the paper by Gupta et al. mentioned in the introduction.

The invention involves a search algorithm that is only based on one data structure. This data structure is a search structure, whose organization is optimized for fast and efficient search operations. The search structure is extended which some additional (auxiliary) information that allows to derive all necessary information to perform update operations.

Routing Table Used as Example

The concept of the invention will be illustrated using the example of a routing table for IP version 4 (IPv4) forwarding in which the search key consists of the 32-bit IP destination address. In this example the routing table contains the following prefixes:

| prefix | | length result |
|---|---|---|
| 1) 00010010001101000101011000000000b | (1234560h–000b) | 31 –> R |
| 2) 00010010001101000101011000000000b | (12345600h) | 32 –> S |
| 3) 00010010001101000101011000000001b | (12345601h) | 32 –> T |

-continued

| prefix | | length result |
|---|---|---|
| 4) 00010010001101000101011001111000b | (12345678h) | 32 -> U |
| 5) 10101011110011011110b | (ABCDEh) | 20 -> V |
| 6) 101010111100110111101111b | (ABCDEFh) | 24 -> W |

The notation in above table is as follows:
 12CDh or AB34h designate prefixes fully represented in hexadecimal form
 5E6Fh-01b designate prefixes whose first portion is represented in hexadecimal form but whose last portion is represented in binary form (because the last portion has not 4 but only 3 or less binary digits)
 The result value contained in a table entry is designated by a capital letter (R or S or T or U etc.) and represents the identification of an output route (link) to be used or of a next processing step to be executed, when the respective entry was found.

Figure 1:
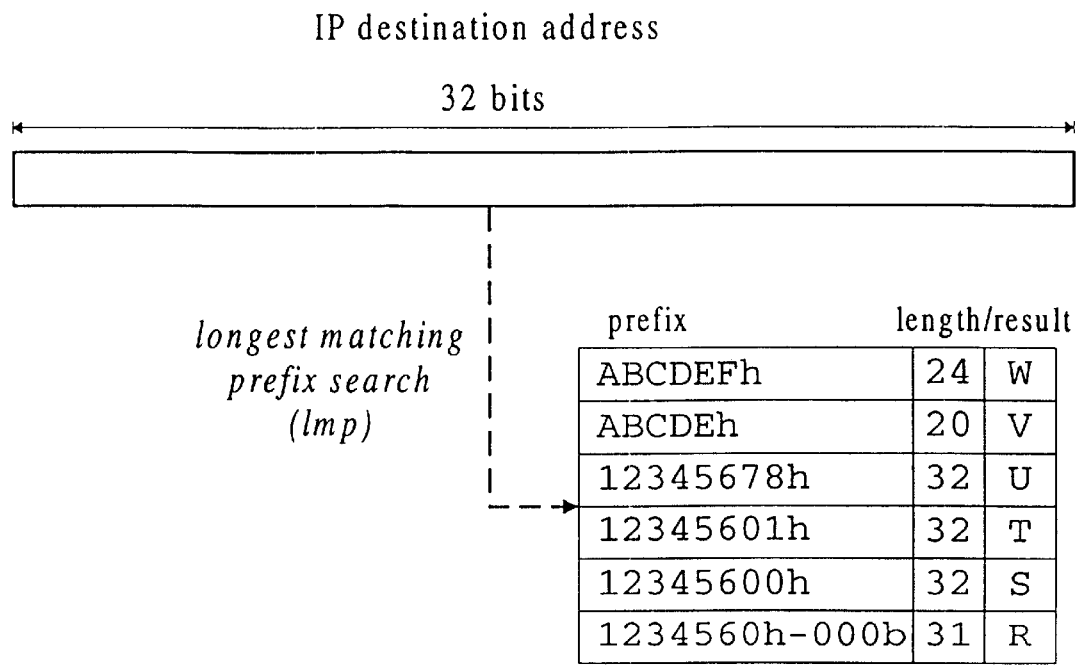
FIG. 1 is a schematic representation of a longest-matching prefix search mechanism for an example of six prefixes with assigned output values (search results).

FIG. 1 illustrates the search process for the routing table of this example. The dotted line with the arrow indicates that the IPv4 destination address is used as a search key to search the routing table.

Basic Structure

Several prior art search methods partition the search key into distinct segments which are then processed in consecutive steps to determine the search result. Two such schemes have been described by Gupta et al. ("Routing Lookups in Hardware at Memory Access Speeds") and Varghese et al. ("Fast Address Lookups using Controlled Prefix Expansion") which were both mentioned already in the introduction.

Figure 2:
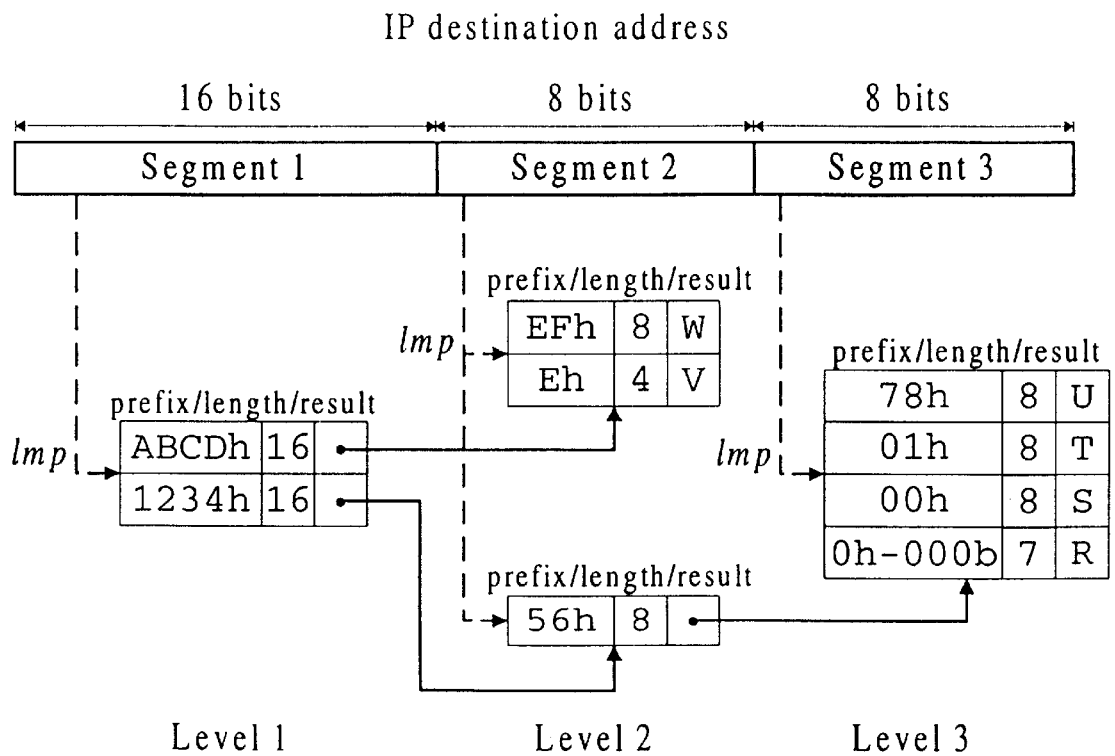
FIG. 2 illustrates a set of prefix tables for the prefix assignments corresponding to those in FIG. 1, using segmented search keys for LMP lookups.

FIG. 2 illustrates how the routing table of FIG. 1 can be organized in multiple smaller 'routing tables' to match a given partitioning of the search key. This data structure is denoted as basic structure. The smaller 'routing tables' that comprise the basic structure are denoted prefix tables. This scheme is known from the prior art.

Details

When the invention is implemented, only one data structure will be used for searching all the time, which is denoted as search structure and which will be discussed later. The basic structure will be constructed only partially and temporarily during update operations which will also be discussed later. For ease of explanation, however, the basic structure will now be discussed as if it were a complete data structure that really can be searched, whereas (when the invention is implemented) it will never exist as a complete structure neither will it be searched.

The organization of the basic structure is usually optimized for fast and efficient update operations. Update operations involve all entries of selected prefix tables to be examined. For this reason a possible way to efficiently implement a prefix table would be a common list structure, whose elements, i.e. the prefixes that make up the prefix table, are accessed one after the other in a stepwise fashion. For efficiency reasons, such a list will not contain multiple occurrences of the same prefix (this in contrast with the search tables that will be discussed later). The basic structure usually embeds characteristics of the search structure to improve update efficiency. These characteristics in the example of FIG. 2 consist of the way in which the IP destination address is divided in multiple segments that are used as search keys to search the prefix tables at the corresponding levels.

In FIG. 2 the IPv4 destination address is divided into three segments consisting of 16, 8 and 8 bits which are used as search keys for searching the prefix tables at the corresponding three levels shown in FIG. 2. The number of segments and their sizes are chosen for illustrative purposes, they can have different values. The basic structure in FIG. 2 is searched in the following way. Segment1 is used as a search key to search the prefix table at level 1. If a longest matching prefix is found, then the result of this search can be either a pointer to a prefix table at the next level or a search result. In the first case, the next segment, Segment2, is used to search the referred prefix table at the next level. The search process continues until either a search result (R, S, T, . . . ) is found, or no matching prefix is found in which case the search does not have a result (search result: "invalid").

For example, an IPv4 address equal to 'ABCDE123h' will result in a search result equal to 'V' for the routing table search shown in FIG. 1. In FIG. 2, the first segment of this IPv4 address equals 'ABCDh' and is used to search the prefix table at level 1. In this prefix table the upper entry will be found as longest matching prefix, and the result of this search consists of a pointer to the upper prefix table at level 2. This table is searched using the second segment of the IPv4 address equal to 'E1h'. The only matching entry of this prefix table is found to be the longest matching prefix Eh, and the result of this search is output value 'V'. This will then be the overall search result. In a similar way can be shown that the data structures in FIG. 1 and FIG. 2 will provide the same search result for any IPv4 address.

The basic structure in FIG. 2 can be directly derived from the routing table shown in FIG. 1. For example, the original prefix 'ABCDEh' with search result 'V' is now split according to the segment boundaries applied in FIG. 2, resulting in two prefixes 'ABCDh' and 'Eh'. The first prefix 'ABCDh' is placed in a prefix table at level 1, with a search result pointing to a prefix table at level two containing the second prefix 'Eh' with the original search result 'V'.

Vice versa, the routing table of FIG. 1 could directly be derived from the basic structure in FIG. 2. A prefix in a prefix table with a search result (that is not a pointer), is concatenated with the prefixes in the prefix tables at previous levels that have to match in order to reach the given prefix with the search result. For example, prefix '78h' in the prefix table at level 3 has a search result 'U'. In order to reach this prefix, the prefixes '1234h' and '56h' have to match the first and second segment respectively. Concatenating these three prefixes results in '12345678h', which is the original prefix in the routing table in FIG. 1.

As the two data structures shown in FIG. 1 and FIG. 2 can be derived directly from each other, update operations (i.e., addition and removal of routing table entries) on the routing table in FIG. 1, can be directly translated into update operations on the data structure of FIG. 2.

Search Structure

Figure 3:
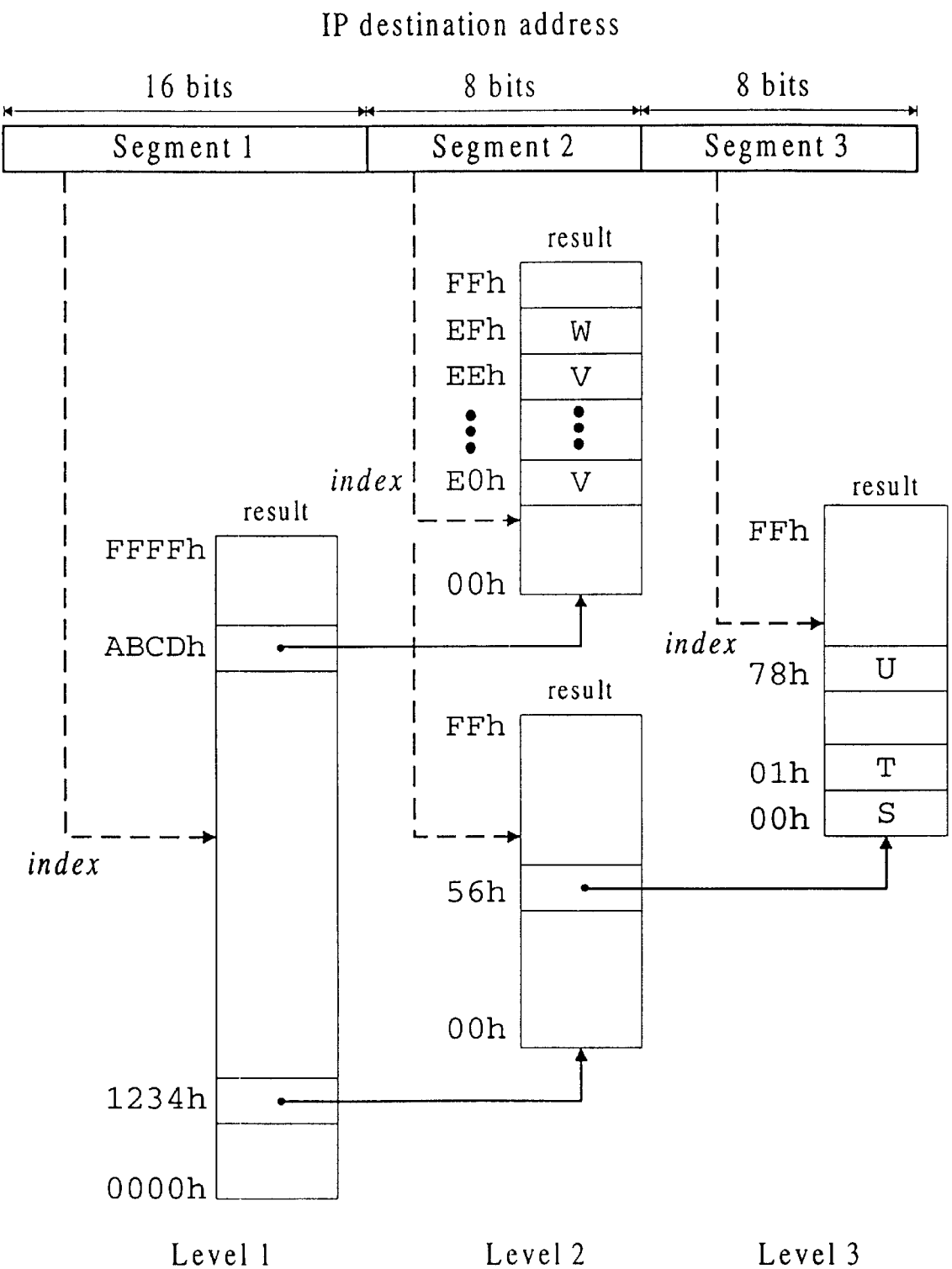
FIG. 3 shows a prefix lookup search structure as known from the prior art, for the same prefix assignments as in FIG. 1 and FIG. 2, where access to the tables is made by indexing rather than longest-matching prefix comparison operations.

FIG. 3 shows an implementation of the longest matching prefix search operations on the prefix tables of FIG. 2, which is similar to the concept described by Gupta et al. and Srinivasan et al. The data structure in FIG. 3 will be denoted as search structure. The part of the search structure that corresponds to a single prefix table in the basic structure will be denoted as a search table. Whereas the basic structure shown in FIG. 2 is optimized for update operations, the search structure is optimized for fast search operations.

In the search structure of FIG. 3, the longest matching prefix search operation on each prefix table is implemented by a table which stores the search result for each possible segment value. The table at the first level contains 2^16=

65536 entries, and the tables at the other two levels contain each 2^8=256 entries. The search result is obtained directly in one single table access for each level, in which the segment value of the respective level is used as index into the table (i.e., no LMP search with the search key, but rather addressing or indexing of a search table).

The search structure of FIG. 3 can be derived directly from the basic structure shown in FIG. 2. For each prefix table the corresponding search table is created in the following way. For each possible value of the segment that is used to search a prefix table, the search result is determined and stored at the respective index within the corresponding search table. If there is no matching prefix for a given segment value, then an 'invalid' search result is stored in the search table at the corresponding index value.

Inability of Described Known Data Structures for Implementing the Invention

It is not possible to derive the basic structure of FIG. 2 from the search structure of FIG. 3 (e.g., for updating the tables). The two reasons for this are the lack of information required to exactly determine the prefixes that correspond to a given search table entry, and the nonexistence of information related to so called 'fully covered' prefixes. These two issues will now be discussed and illustrated using the example of FIG. 2.

Prefix Information

The upper prefix table at the second level in FIG. 2 consists of the following two prefixes:

| prefix | | length result |
|---|---|---|
| 1) 1110b (Eh) | | 4 -> V |
| 2) 11101111b (EFh) | | 8 -> W |

The upper search table at the second level in FIG. 3 will provide the correct search results for this prefix table. These search results, however, would be exactly the same if the upper prefix table in FIG. 2 would contain the following prefixes:

| prefix | | length result |
|---|---|---|
| 1) 11100000b (E0h) | | 8 -> V |
| 2) 11100001b (E1h) | | 8 -> V |
| 3) 11100010b (E2h) | | 8 -> V |
| 4) 11100011b (E3h) | | 8 -> V |
| 5) 11100100b (E4h) | | 8 -> V |
| 6) 11100101b (E5h) | | 8 -> V |
| 7) 11100110b (E6h) | | 8 -> V |
| 8) 11100111b (E7h) | | 8 -> V |
| 9) 11101000b (E8h) | | 8 -> V |
| 10) 11101001b (E9h) | | 8 -> V |
| 11) 11101010b (EAh) | | 8 -> V |
| 12) 11101011b (EBh) | | 8 -> V |
| 13) 11101100b (ECh) | | 8 -> V |
| 14) 11101101b (EDh) | | 8 -> V |
| 15) 11101110b (EEh) | | 8 -> V |
| 16) 11101111b (EFh) | | 8 -> W |

Both prefix tables provide exactly the same search results for any given segment value and therefore would result in the same search table as shown in FIG. 3. The difference between the two tables becomes important in case of update operations, as will be explained in the sequel.

Fully Covered Prefixes

The prefix table at the third level in FIG. 2 consists of four prefixes including the following three:

| prefix | | length result |
|---|---|---|
| 1) 0000000b | (0h–000b) | 7 -> R |
| 2) 00000000b | (00h) | 8 -> S |
| 3) 00000001b | (01h) | 8 -> T |

The second and third prefix consist of the first prefix concatenated with a '0' or '1', respectively. For this reason, if the first prefix matches a given segment value, then either the second or third prefix will also match this segment value. and therefore the first prefix will never be the longest matching prefix. This can be seen from the corresponding search table at the third level in FIG. 3 in which the search result 'R' corresponding to the first prefix does not occur. The first prefix will be denoted as a prefix that is fully covered by other prefixes. As fully covered prefixes do not occur in the search table in FIG. 3, the corresponding prefix table cannot be derived from this search table.

A fully covered prefix does not affect the search result for any given segment value. However, this will change in case of an update operation in which one of the prefixes that covers it, for example the second prefix 00000000b, would be removed.

The existence of a significant number of fully covered prefixes within routing tables is very common. This can be seen, for example, within the large routing tables (having between 20000 and 75000 entries) that are available at "http://www.merit.edu/ipma/routing_table" for the public.

Auxiliary Information to Enable Updating

In order to be able to derive the basic structure from the search structure, auxiliary information needs to be included in the search structure when the corresponding basic structure is not maintained, according to the invention. The above two examples have shown that this auxiliary information should allow to:

1) derive prefixes for which the corresponding search results do occur in a search table;
2) derive fully covered prefixes for which the corresponding search results do not occur in a search table.

Prefix Length Indication as Auxiliary Information

Figure 4:
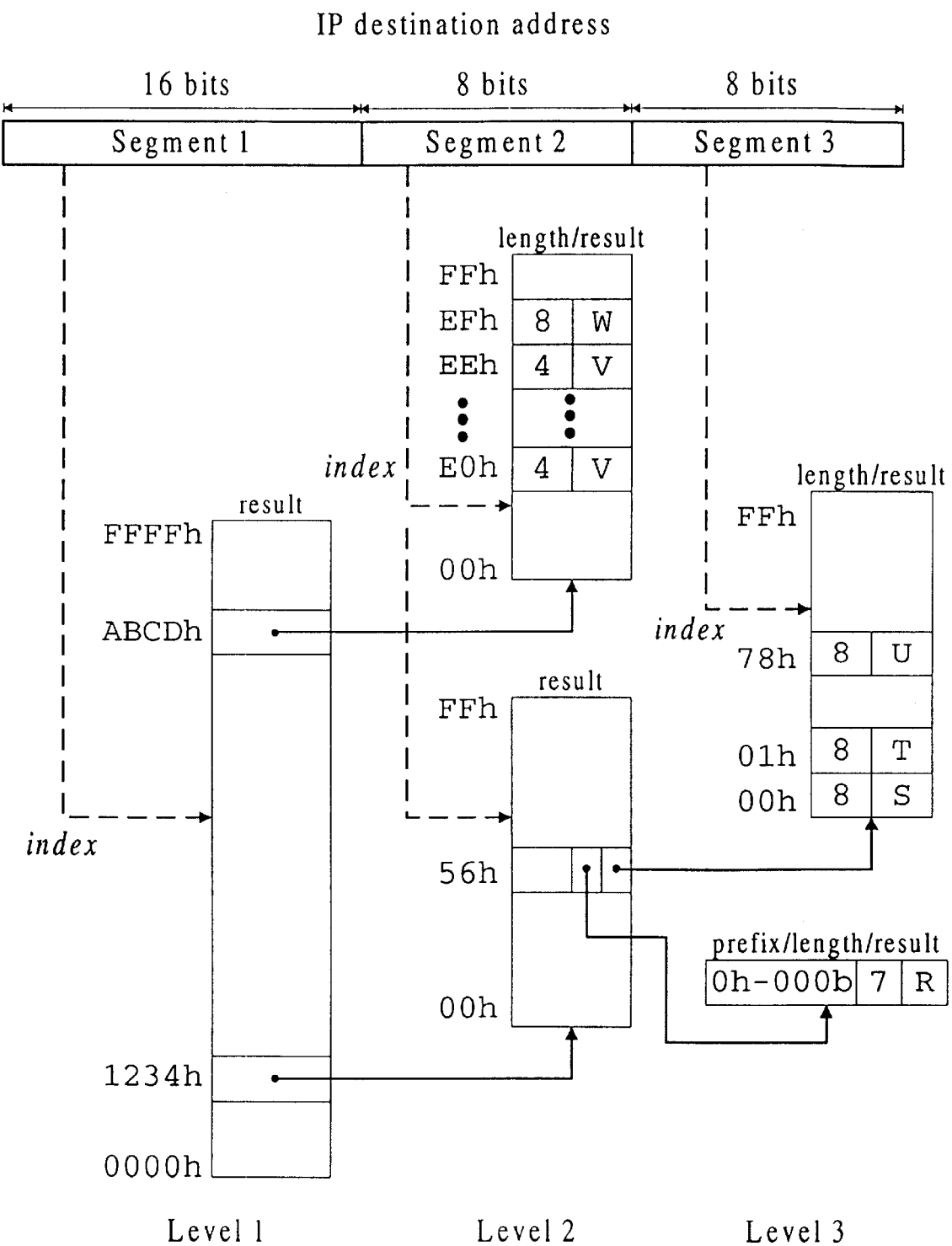
FIG. 4 is an illustration of a search table data structure implementing the invention, for the same set of prefixes and assigned output values as in the previous figures.

FIG. 4 shows an example of a possible way to realize this by adding information to the search structure of FIG. 3. To each table entry that contains a search result, a length field is added that indicates the length of the prefix that corresponds to that search result. The index value of a table entry together with the value of this length field will provide directly the prefix that corresponds to the search result in that table entry. By processing all table entries within a search table, all prefixes can be derived for which search results are contained in the search table.

This is illustrated in FIG. 5 which shows the upper search table at the second level in FIG. 4. By accessing all search table entries starting at index 00h up to index FFh, first 224 invalid table entries are found (indices 00h to DFh). The table entry at index E0h contains a length field equal to 4 and a search result 'V'. By taking the first 4 bits of this index E0h, the prefix Eh with length 4 can be derived which has a search result 'V'. This same prefix is also derived from the next table entries at indices E1h to EEh. The table entry at index EFh contains a length field equal to 8 and a search result 'W'. By taking the first 8 bits of this index EFh, a prefix EFh with length 8 is derived which has a search result 'W'. The remaining table entries at indices F0h to Ffh are invalid. This shows that from this search table only two different unique prefixes can be derived. These are placed in a 'derived' prefix table that is shown in FIG. 5.

FIG. 6 shows the search table and the corresponding prefix table that were discussed in the previous section and which results in the same search results as the search table that is shown at the top of FIG. 5. The differences between the two search tables are only in the values of the length fields. Based on these fields, now the correct corresponding prefix table can be derived. The difference becomes evident in case of an update operation. For the example when the prefix 11101111b (EFh) of length 8 is removed from both derived prefix tables, the two 'updated' prefix tables and corresponding 'derived' search tables are shown in FIG. 5 and FIG. 6, respectively. Now a search operation with a segment value equal to 11101111b (EFh) will result in a search result 'V' for the 'derived' search table shown in FIG. 5 and in an 'invalid' search result for the 'derived' search table shown in FIG. 6.

Fully Covered Prefixes as Auxiliary Information

Since the search results corresponding to fully covered prefixes do not occur in a search table, the information regarding fully covered prefixes together with the corresponding search results must be stored additionally. One example to do so is shown in the search table at the third level in FIG. 4, where the fully covered prefix 0000000b (which can also be written as 0h-000b) is stored in a separate table within the search structure, which will never be accessed during the search operation. The table entry in the lower search table at the second level contains an additional pointer to this table containing fully covered prefixes. Based on both tables, all prefixes including fully covered prefixes can be derived and the entire original prefix table can be constructed from the search table.

Fully covered prefixes can also be stored in alternative ways, for example in the table entries that contain invalid search results. A correct setting of special flag bits in these entries should indicate an invalid search result if these entries are accessed during the search operation, but should also allow to retrieve the fully covered prefixes during the update operation. Two examples of this way of storing fully covered prefixes will be discussed later.

Update Operation

Figure 7:
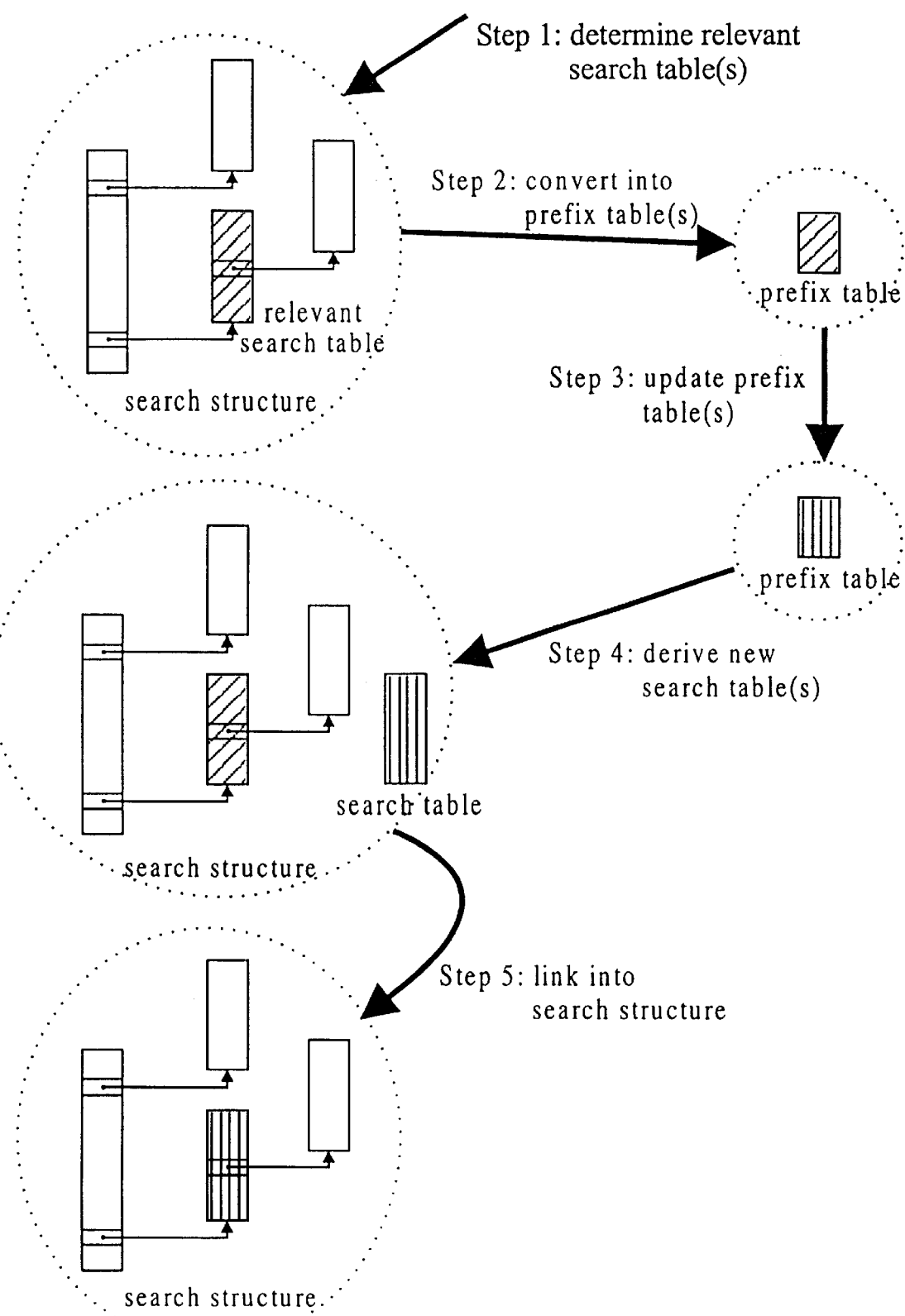
FIG. 7 is a schematic illustration of the updating procedure for search tables, according to the invention.

FIG. 7 illustrates the concept of an update operation which consists of the following steps:

1) It is determined which search tables that are part of the search structure are relevant for the update operation and have to be modified, by performing a search operation using the prefix that is to be inserted or deleted as search key. These include also the additional tables or additional table entries containing fully covered prefixes that relate to these relevant search tables.

2) The corresponding prefix tables that are part of the basic structure are derived from these relevant search tables.

3) These prefix tables are modified based on the update operation.

4) New search tables are derived from the modified prefix tables.

5) The new search tables are put back into the search structure, replacing the original search tables.

In FIG. 7 only one relevant search table is shown for illustrative purposes. It is possible that there are multiple relevant search tables for a given update operation.

These various steps will now be discussed in more detail.

The following two update examples on the search structure of FIG. 4 will be used to illustrate these steps:

a) prefix 00010010001101000101011000000001b (12345601h) with length 32 and search result 'T' will be removed;

b) a new prefix 10101011110011010000000000010010b (ABCD0012h) with length 32 and search result 'Z' will be inserted.

Figure 8:
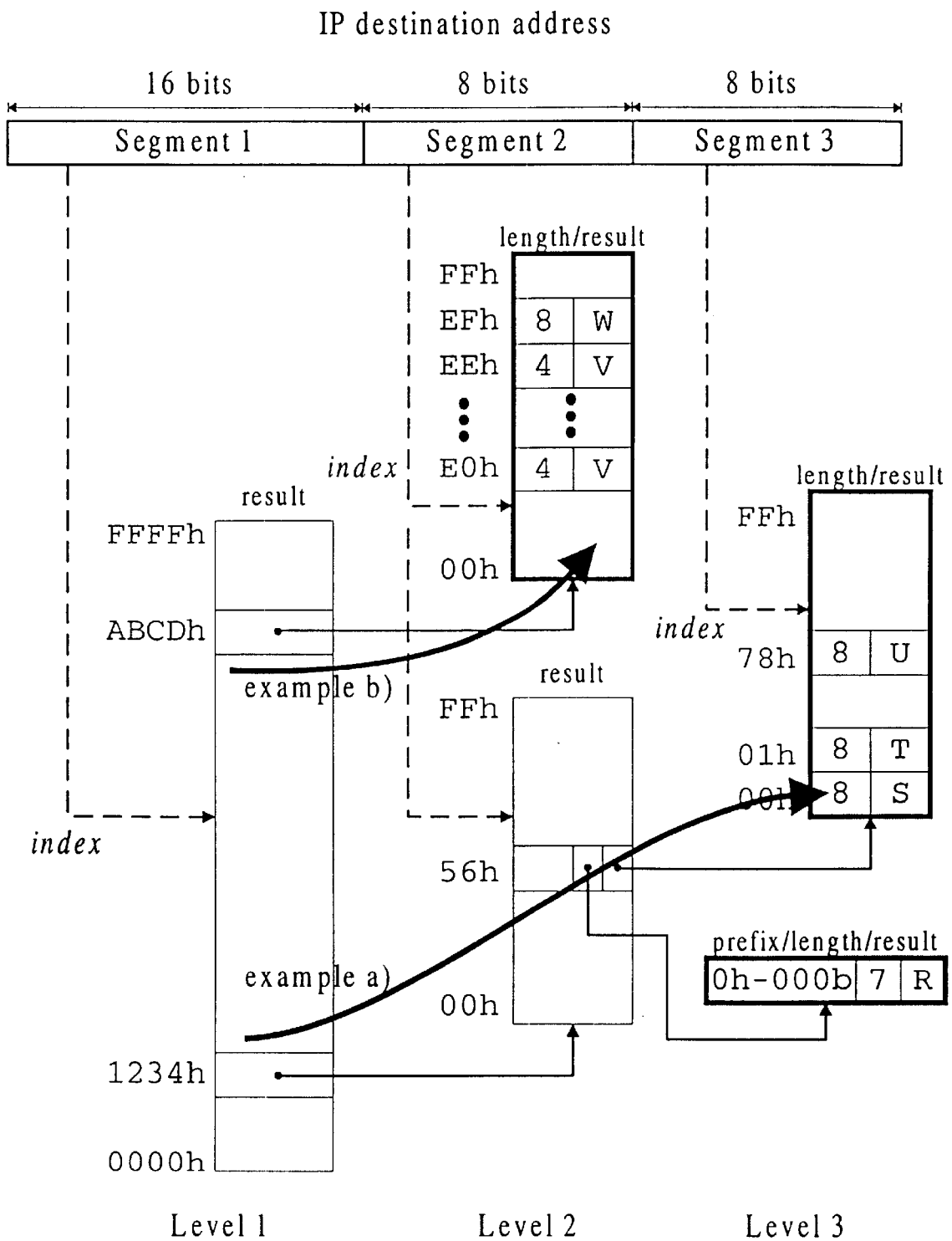
FIG. 8 shows the identification of relevant tables in the search data structure of FIG. 4, for an updating operation involving both, insertion and deletion of a prefix assignment.

1) Determine Relevant Search Tables that Need To Be Modified for the Update Operation, by Performing a Search Using Tie Prefix Involved in the Update Operation as Search Key In case the update operation involves the removal of an existing prefix from the search structure, then a search operation using that prefix as search key will find the search result corresponding to that prefix. The search tables that are involved in the successive steps of the search operation, and that contain at least one table entry that relates exclusively to the prefix to be removed and does not relate to any other prefix, are relevant search tables that need to be modified. FIG. 8 shows the successive search tables that are involved in the search operation on the prefix of example a). Only the search table at the third level contains a table entry (at index 01) that relates exclusively to the prefix to be removed. Therefore this is the only relevant search table that needs modification. In addition to this search table, a separate table exists that contains the fully covered prefix that is not contained in the search table. This table is also used in the update process.

Search tables which are found to be relevant for the update operations are marked by thick frame outlines in FIG. 8.

In case the update operation involves the insertion of a new prefix into the search structure, then a search operation using that prefix as search key will end in either an invalid table entry, or end in a table entry that corresponds to a shorter prefix that is already in the search structure and which is a prefix of the new prefix that is to be inserted, or end when all prefix bits have been used. The search table in which the search operation ends is the only relevant search table that needs modification. In FIG. 8 this is the upper search table at the second level for the insert operation of example b).

2) Derive Corresponding Prefix Tables

Figures 9, 10:
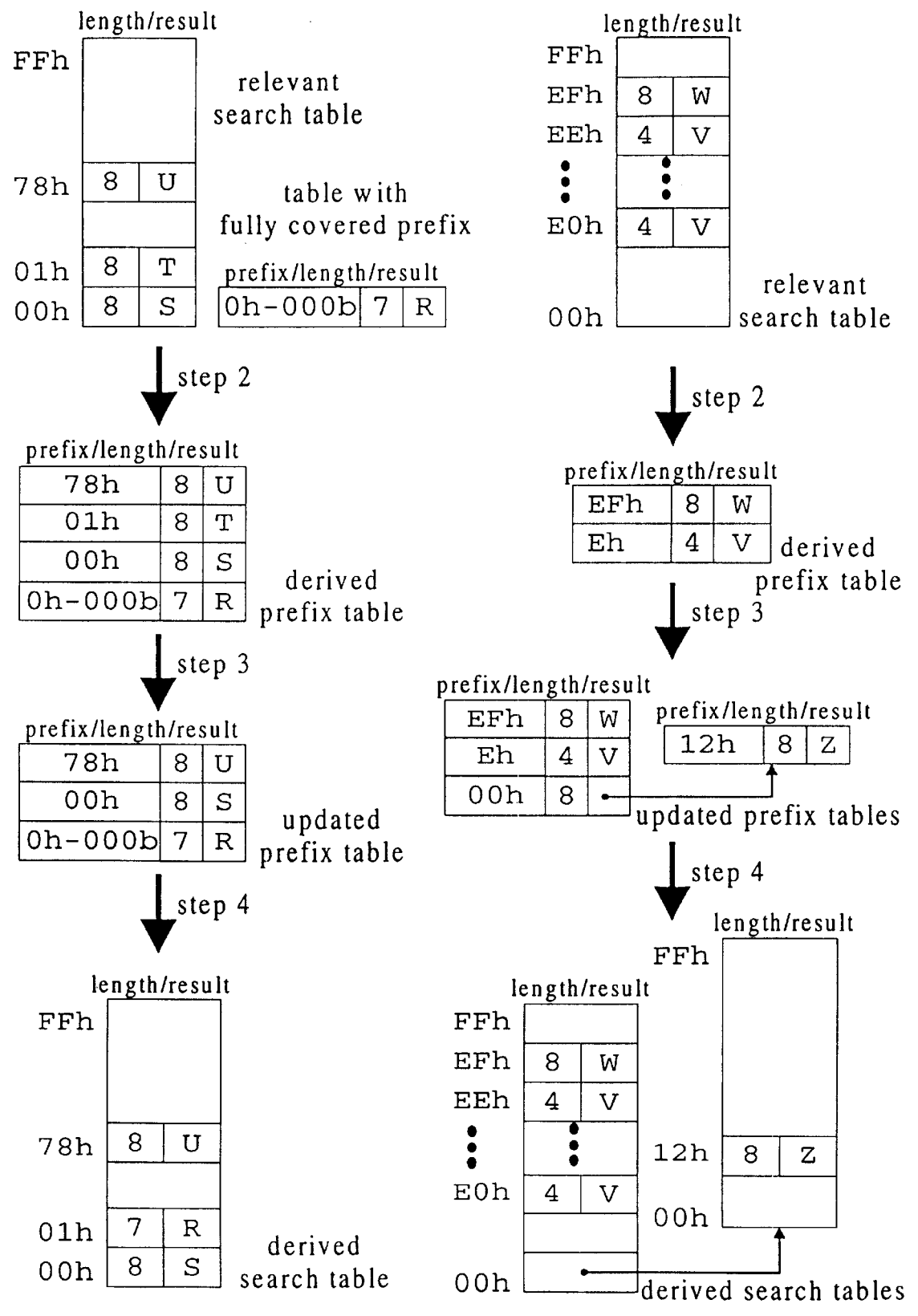

The prefix tables corresponding to the relevant search tables are derived as described before. FIG. 9 and FIG. 10 show this for example a) and example b), respectively.

3) Update Prefix Tables

Prefix 00000001b (01h) with length 8 and search result 'T' within the derived prefix table in FIG. 9 is the only prefix in that table that relates to the prefix 00010010001101000101011000000001b (12345601h) withlength 32and search result 'T' that has to be removed. FIG. 9 shows the updated prefix table after removal of prefix 00000001b.

The prefix 10101011110011010000000000010010b (ABCDE012h) with length 32 and search result 'Z' that has to be inserted into the routing table, has a value equal to 00000000b (00h) for the second segment and has a value equal to 00010010 b (12h) for the third segment. Because of this, the prefix table in FIG. 10 that is derived from the relevant search table and which is at the second level, will be extended with a prefix 00000000b (00h) with length 8 that points to a new prefix table at the third level which only contains a prefix 00010010b (12h) with length 8 and a search result 'Z'.

4) Derive Search Tables

FIG. 9 and FIG. 10 show the search tables that can be derived from the updated prefix tables for the two examples as is discussed before. The search result is determined for each possible segment value based on the updated prefix table. The search result together with the length of the prefix that corresponds to that search result, is stored in the table entry that corresponds to an index equal to that segment value.

For example, for a segment value equal to 00h, both prefix 0h-000b with search result 'R' and prefix00h with search result 'S' match. Since prefix00h is the longer matching prefix of these two, the corresponding prefix length 8 and corresponding search result 'S' are stored in the table entry at index 00h. For a segment value equal to 01h, only prefix 0h-000b with search result 'R' matches, therefore the corresponding prefix length 7 and corresponding search result 'R' are stored in the table entry at index 01h.

5) Place Modified Search Tables Back in Search Structure

Figure 11:
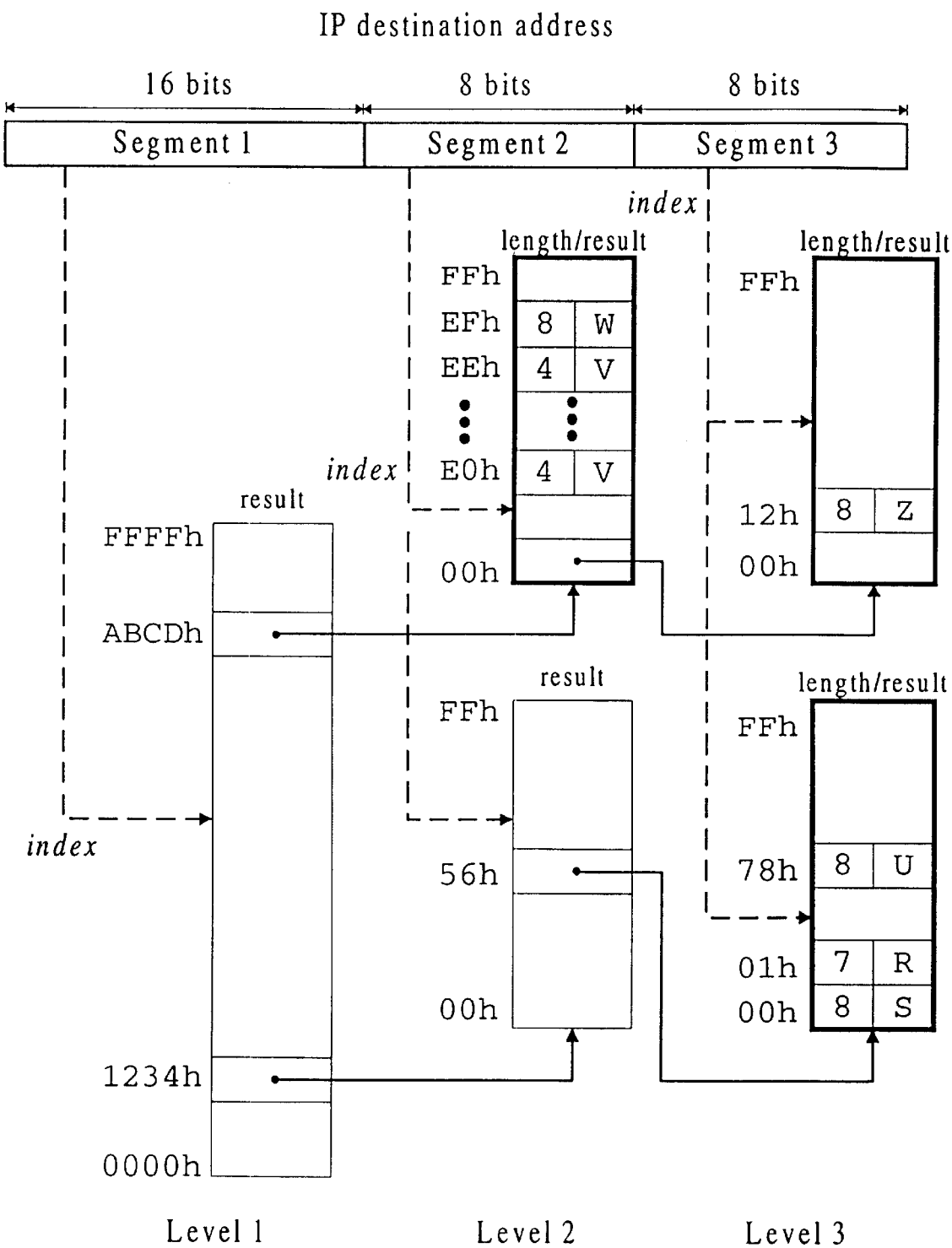
FIG. 11 shows the resulting search data structure after an updating operation according to FIGS. 8, 9, and 10.

FIG. 11 shows the updated search structure (to be compared to the original search structure of FIG. 4) in which the new search tables have replaced (and supplemented) the original relevant search tables.

The above discussion of the two examples involving an insert and delete operation, might suggest that these two update operations are performed in parallel. This is done for illustrative purposes. It is possible that only one update operation is performed at the time, but it is also possible that two or more update operations are performed in parallel.

Alternative Search Structure Implementations

Figure 12:
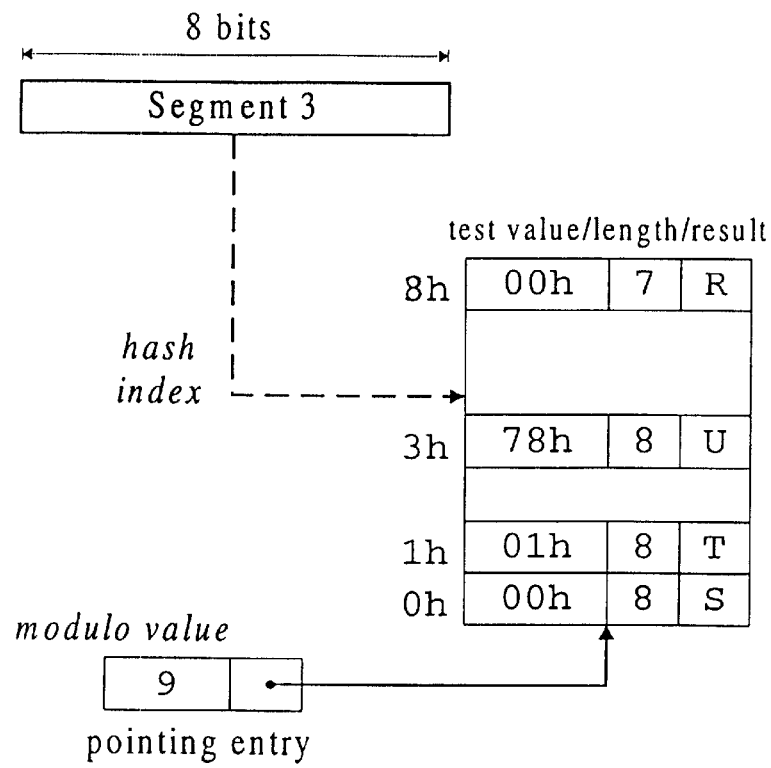
FIG. 12 is an exemplary search table of a search data structure, optimized by a hashing procedure, in which the invention is applied, prior to an update operation.
Figure 13:
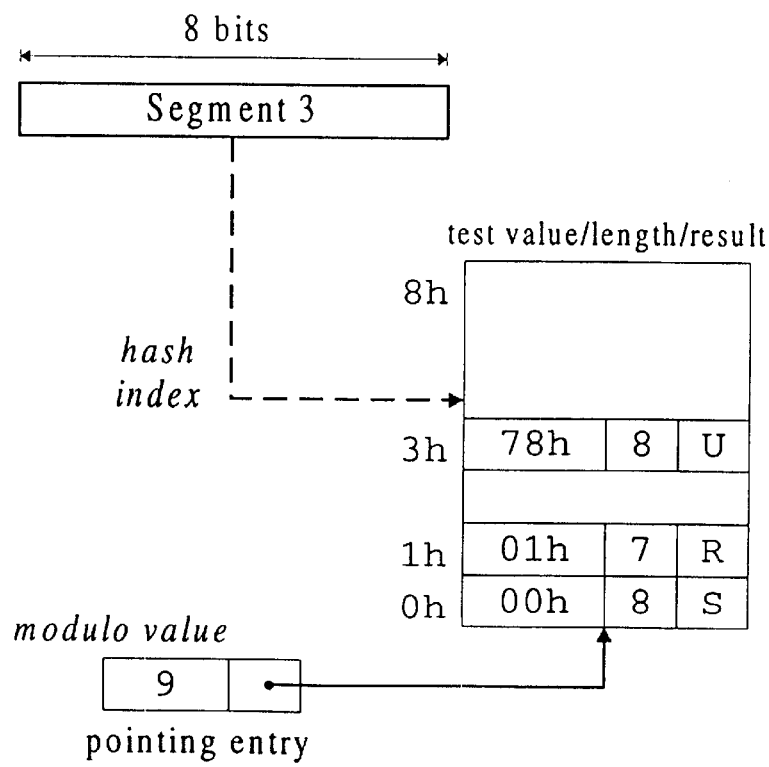
FIG. 13 is an exemplary search table of a search data structure, optimized by a hashing procedure, in which the invention is applied, after an update operation.
Figure 14:
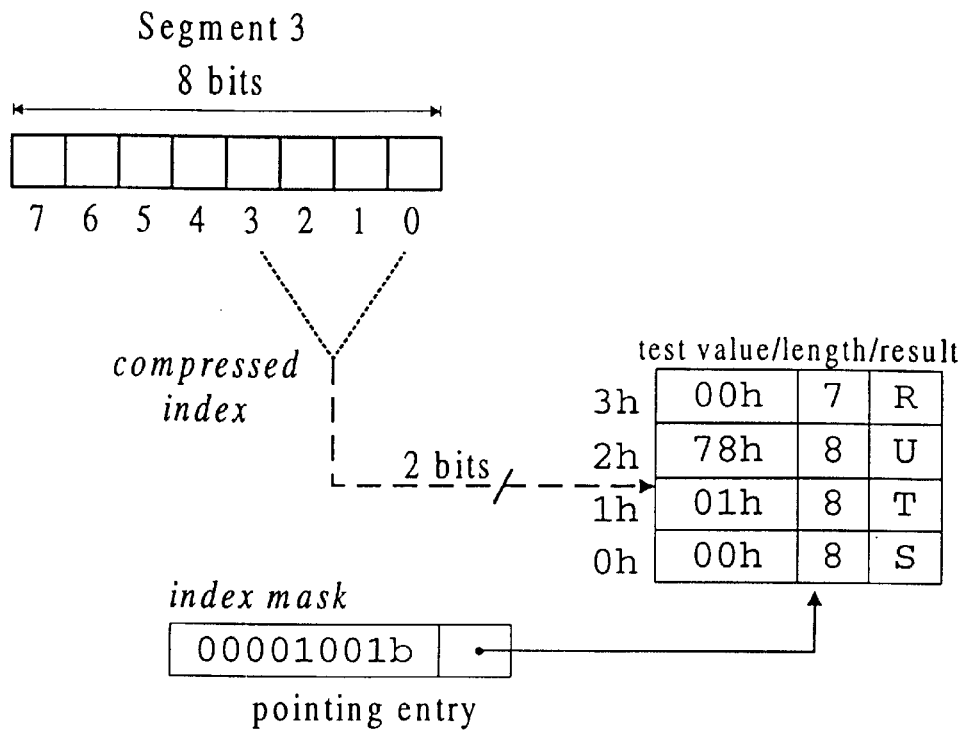
FIG. 14 is an exemplary search table of a search data structure, optimized by a table compression procedure, in which the invention is applied, prior to an update operation.
Figure 15:
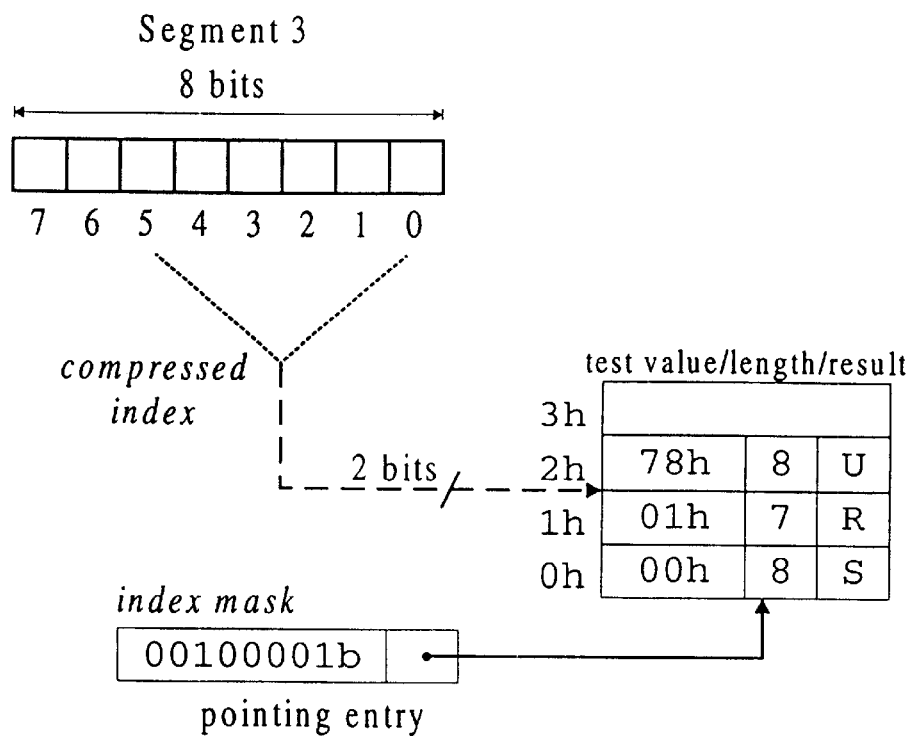
FIG. 15 is an exemplary search table of a search data structure, optimized by a table compression procedure, in which the invention is applied, after an update operation.

Application of the present invention does not restrict the search structure implementation to a structure as shown in FIG. 4, but alternative structures are included as well. FIG. 12 and FIG. 14 illustrate two of these alternative structures that can be used to implement the relevant search table that is shown on top in FIG. 9. In FIG. 13 and FIG. 15 these two alternative structures are shown after an update operation (corresponding to the derived search table shown at the bottom of FIG. 9). These two structures will be discussed here in more detail.

Using an 8 bit segment of the IP destination address as index into a table to implement a longest matching prefix search, requires that this table has 2^8=256 entries. If only few of these entries contain valid information, then this scheme does not use memory efficiently.

An improved method that is based on hashing is shown in FIG. 12 applied on the relevant search table that was shown in FIG. 9. In the table entry at the previous level that contains a pointer to a search table, which is called pointing entry, an additional value is stored that is denoted as modulo value. A hash index is now calculated that equals the segment value modulo this value which is chosen such that no two segment values that correspond to valid table entries in the original search table in FIG. 9 (which were 00h, 01h and 78h), will result in the same hash index. A modulo value equal to 9 is the smallest value satisfying this condition. This modulo value maps the original index values 00h, 01h and 78h on hash indices 0h, 1h, and 3h respectively. At most one segment value corresponding to a valid table entry is mapped on each hash index. This segment value will now be stored as a test value in the hash table entry corresponding to that hash index. After the hash operation, the segment value will now be tested against this test value. A negative test indicates a segment value that corresponds to an invalid table entry in the original table of FIG. 9, and therefore results in an invalid search result. A positive test indicates a segment value corresponding to a valid table entry, and the corresponding search result or a pointer to a table at the next level can be read from the hash table entry. The other hash table entries, for which the hash indices do not correspond to valid table entries in the original table, result in an invalid search result. Each hash table entry contains also a length field which in combination with the test value allows to determine the prefixes that correspond to the various valid hash table entries.

Inherent to this method is that the calculation of the hash index from the test value that is stored in a hash table entry, will result in the hash index of that hash table entry. If this would not be the case for a given hash table entry, then the test against the test value that is stored in that hash table entry, will always fail. This property can now be exploited to store fully covered prefixes in empty (invalid) hash table entries. For example, the fully covered prefix 0h-000b with search result 'R' that was stored in a separate table next to the relevant search table in FIG. 9, is stored in the hash table at hash index 8h. Any segment value that will result in a hash index equal to 8h, will never test positively against the test value 00h, since 00h modulo 9 equals 0h. In this way, all the information related to prefix 0h-000b is included in the hash table and can be used to derive the corresponding prefix table, but this information will never provide a search result during a search operation since the test against the test value will always fail. Using this information, the prefix tables shown in FIG. 9 can be derived, and finally a new hash table can be determined from the updated prefix table. This derived search table that is based on hashing is shown in FIG. 13. In this example, the same modulo value could be used again. This is usually not the case, and is dependent on the prefixes that will be added or removed during the update operation.

FIG. 14 shows a second alternative implementation of the relevant search table of FIG. 9. Instead of using all 8 bits of the segment value, now only two bits are used which comprise a so called compressed index. These bits are selected such that the compressed index has different values for the segment values that relate to valid table entries in the original search table in FIG. 9. A so called index mask is added to the pointer that indicates the number and location of the bits that comprise the compressed index. For the index mask shown in FIG. 14, the segment values that correspond to valid table entries in the original search table in FIG. 9 (which were 00h, 01h and 78h), are mapped on compressed indices 0h, 1h, and 2h respectively. The principle used for generating the search tables shown in FIG. 14 and FIG. 15 can be regarded as a special form of hashing, in which the hash index (i.e., the compressed index) consists of certain bits of the segment value. This type of hashing is more efficient than the modulo calculation for the given example, since the resulting 'hash table' consists of only four entries in FIG. 14 compared to the nine hash table entries in FIG. 12.

For the same reason as with the modulo based hashing method, a length field and a test value equal to a valid segment value are included in the table entries. This type of hashing has the property that determining the compressed index from a test value in a given table entry, will result in the compressed index of that table entry. For example, test values 00h, 01h, and 78h will result in compressed indices 0h, 1h, and 2h, which equal the compressed indices corresponding to the table entries in which these test values are stored. If this would not be the case, then the test against that test value would always fail.

Similar as with the modulo based hashing, this property can be exploited to store fully covered prefixes. Fully covered prefix 0h-000b with search result 'R' is now stored at the table entry corresponding to compressed index 3h. Any segment value that would result in a compressed index 3h will never test positively against test value 00h. This allows to store the fully covered prefix into the table from which it can be accessed during the update process, while it will not affect the result of the search operation. FIG. 15 shows a compressed index based structure corresponding to the derived search table of FIG. 9. Now a different index mask is used (for illustrative purpose, as the original index mask could be used as well and would result in the same mapping of valid segment values on compressed indices).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. Search data structure in a system for finding output information, such as directions for forwarding messages to output links, in response to search keys comprising prefixes used for longest-matching prefix searches, wherein:
   a) the search data structure comprising search tables is derived from a basic data structure comprising prefix tables including complete information for prefixes of variable length and respective assigned output information;
   b) the search data structure is subdivided into subsets of search tables which were separately derived from respective prefix tables in the complete basic data structure; and
   c) each subset of search tables in the search data structure comprises a prefix length field enabling a reconstruction of the respective prefix tables in the basic data structure so that local or partial updating of the search data structure is possible without maintaining the complete basic data structure of prefix tables in the system.

2. Search data structure according to claim 1, wherein the prefix length field consists of a length indication in each search table entry, indicating the length of the prefix in the prefix table of the basic data structure from which the respective entry was derived.

3. Search data structure in accordance with claim 2, further comprising entries for fully covered prefixes in respective search table subsets, which are not used for searching but which can be used for updating when a longer prefix including this fully covered prefix is canceled.

4. Search data structure in accordance with claim 1, wherein the search tables were derived from the prefix tables of the basic data structure by table compression, including separation of the search key prefixes into segments and providing separate search tables for each segment.

5. Search data structure in accordance with claim 1, wherein the search tables were derived from the prefix tables of the basic data structure by a hashing procedure including selection of only relevant bits required for searching from the search key prefixes for insertion into each search table entry, and providing prefix masks for selecting respective bits from the search keys.

6. Search data structure in accordance with claim 1, further comprising entries for fully covered prefixes in respective search table subsets, which are not used for searching but which can be used for updating when a longer prefix including this fully covered prefix is canceled.

7. Search data structure in a computer readable medium for finding output information, such as directions for forwarding messages to output links, in response to search keys divided into segments, the search data structure comprising:
   a plurality of search tables configured to store search results for segment values, each of the search tables including:
      an index field corresponding to the search key segments;
      a prefix length field coupled to the index field indicating the lengths of search prefixes corresponding to the search results, the prefix length field enabling a reconstruction of respective prefix tables in a basic data structure so that local or partial updating of the search tables is possible without maintaining a complete basic data structure of prefix tables; and
      a result field coupled to the index field and storing the search results.

8. The search data structure of claim 7, wherein the search result includes a pointer to another search table if more than one search result is possible for the segment value.

9. The search data structure of claim 7, wherein the search result includes an invalid indicia if there is no matching prefix for a corresponding segment value.

10. The search data structure of claim 7, further comprising at least one fully covered prefix table indicating at least one search result for a non-longest matching prefix.

11. The search data structure of claim 10, wherein the at least one of the plurality of search tables includes a fully covered flag and a pointer to the at least one fully covered prefix table.

12. The search data structure of claim 7, wherein the index field includes a hash index such that the search key segment modulo a hash value equals the hash index.

* * * * *